July 14, 1931.  E. DUGAN  1,814,907
MULTIPLE CONTROL VALVE
Filed May 1, 1929  2 Sheets-Sheet 1

Edd Dugan
INVENTOR
BY Victor J. Evans
ATTORNEY

July 14, 1931.   E. DUGAN   1,814,907
MULTIPLE CONTROL VALVE
Filed May 1, 1929   2 Sheets-Sheet 2

Edd Dugan
INVENTOR
BY *Victor J. Evans*
ATTORNEY

Patented July 14, 1931

1,814,907

UNITED STATES PATENT OFFICE

EDD DUGAN, OF WICHITA FALLS, TEXAS

MULTIPLE CONTROL VALVE

Application filed May 1, 1929. Serial No. 359,532.

This invention relates to valves and has especial relation to valves for controlling a multiplicity of discharge ports, an object of the invention being to provide a valve which is capable of controlling the distribution of a lubricant from a suitable source to a number of different points, the invention being useful for lubricating various types of machines, both stationary and movable, and may be used to distribute lubricant to the various parts of an automobile.

Another object of the invention is the provision of a multiple discharge valve which may be controlled either from an adjacent or remote point, means being provided to indicate to the operator when the valve has completed a cycle of operation.

With the above and other objects in view, the invention further includes the following novel features and details of construction, to be hereinafter more fully described, illustrated in the accompanying drawings and pointed out in the appended claim.

In the drawings:—

Figure 1:
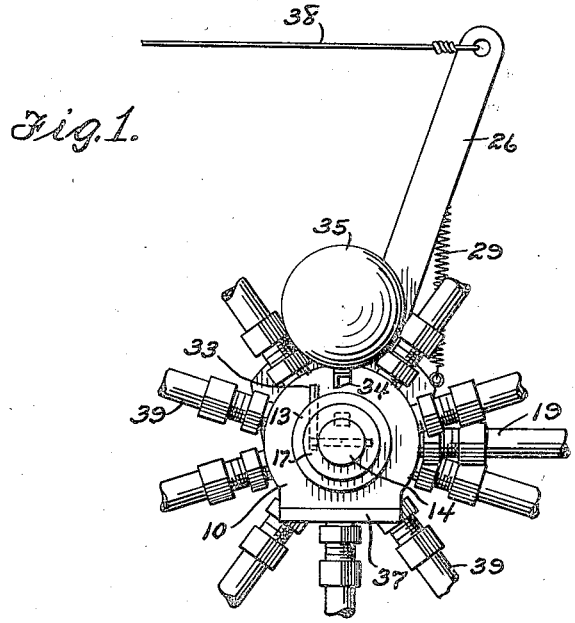
Figure 1 is an end view of the valve.
Figure 2:
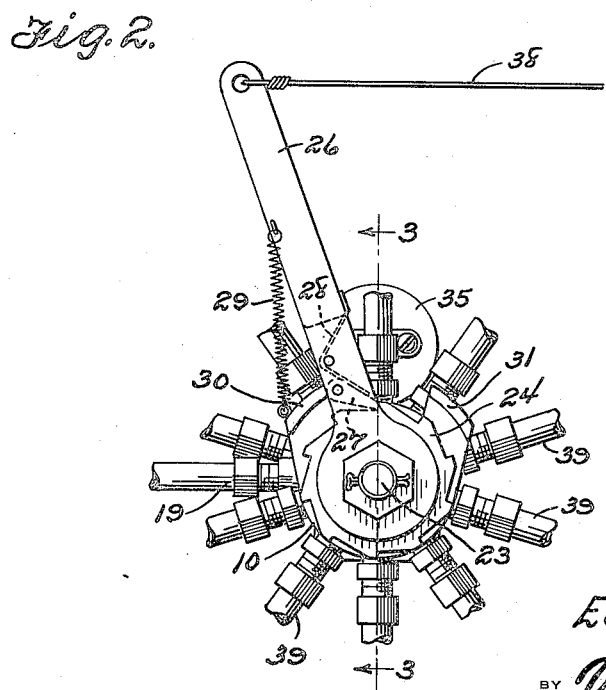
Figure 2 is a view looking at the opposite end.
Figure 3:
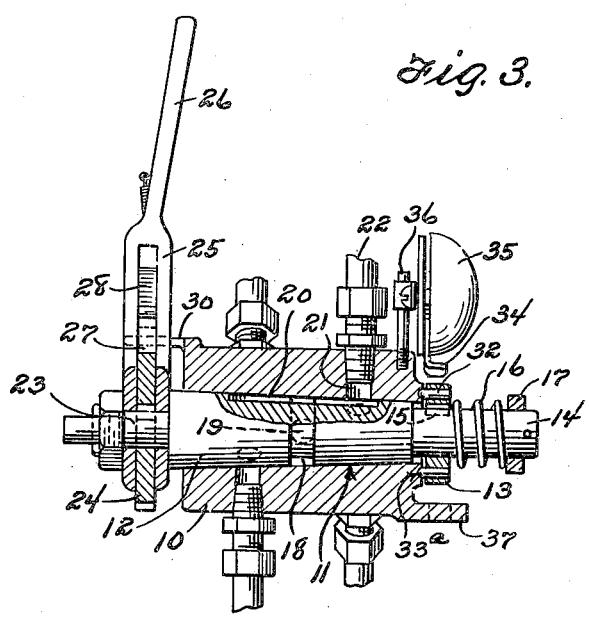
Figure 3 is a section on the line 3—3 of Figure 2.

Referring to the drawings in detail wherein like characters of reference denote corresponding parts, the reference character 10 indicates the valve housing which is provided with a tapered chamber 11 to rotatably receive a tapered plug 12. This plug operates upon the seat provided by the walls of the chamber 11 and carries at one end a collar 13 which is keyed to the stem 14 of the valve plug as indicated at 15. The collar 13 will thus rotate with the plug and is capable of sliding movement upon the key 15. A coil spring 16 is mounted upon the stem 14 between the collar 13 and a collar 17 which is keyed to the stem, so that the collar 15 will be yieldingly forced in a direction toward the housing and the plug 12 will be held in proper contact with its seat.

The plug 12 is provided with a circumferential groove 18 which is in communication with an inlet port 19, the latter being adapted for connection with the source of lubricant.

The groove 18 is in communication with a groove 20 which extends longitudinally of the plug in opposite directions from the groove 18. The groove 20 is adapted for communication with a plurality of spaced discharge ports 21 which are provided in the housing 10 and arranged in the path of travel of the groove, so that communication may be established between the intake port 19 and any one of the discharge ports 21.

The intake and discharge ports may be connected with suitable conductor pipes or tubes, indicated at 22, so that either hard or soft lubricant may pass into the valve from a suitable source of supply and be distributed to the desired points. The plug of the valve is also provided with a stem 23, and fast upon this last mentioned stem is a ratchet wheel 24. This wheel is provided with a tooth for each of the distributing ports 21. Mounted for pivotal movement on the stem 23 and straddling the ratchet wheel 24 is the bifurcated end 25 of an operating arm or lever 26. This arm or lever has pivotally secured thereto a dog 27 which is yieldingly forced into engagement with the teeth of the ratchet wheel 24 by means of a spring 28. A spring 29 which has one of its ends connected to the arm or lever 26 and its opposite end secured to the housing serves to return the arm to normal position after each operation.

Normally, the spring 29 holds the arm 26 against a stop 30 which extends from the housing 10 and by moving the arm 26 pivotally away from this stop, the plug 12 will be rotated a distance equal to one tooth of the ratchet wheel. The discharge ports 21 are so spaced that this movement will move the groove 20 from register with one port, into register with the next adjacent port. An additional stop 31 extending from the housing and spaced from the stop 30 limits pivotal movement of the lever 26 away from the last mentioned stop. In addition, the collar 13 carries studs 32 which extend therefrom into sockets 33ª provided in the end of the housing 10. These sockets are circumferentially spaced in accordance with the circumferential spacing of the ports 21 so that the plug 12 will be yieldingly held in position to maintain register between these ports and the groove 20.

When the valve is in normal position, the plug 12 will be out of register with all of the discharge ports.

Extending from the collar 13 is a pin 33 and located in the path of movement of this pin is the lever 34 of an audible signal or bell 35. This bell is mounted upon a stud 36 which extends from the housing.

When the valve is in its normally closed position, the pin 33 will be so located that a complete revolution of the plug 12 must be made before it engages the lever 34 of the signal 35. By this means the operator will be notified that the valve has completed a cycle of operation and lubricant supplied to all of the parts of the machine being lubricated.

An attaching ear 37 may be provided for the housing 10.

The valve is capable of controlling the supply of lubricant to various types of machines and may be operated if desired from a remote point. For this purpose, an operating cord or wire 38 may be connected with the lever 26.

Figure 4:
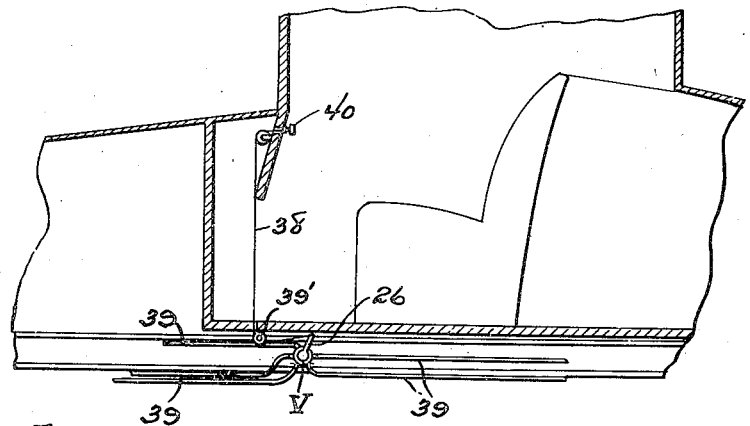
Figure 4 is a fragmentary sectional view illustrating the manner in which the valve may be applied to an automobile.
Figure 5:
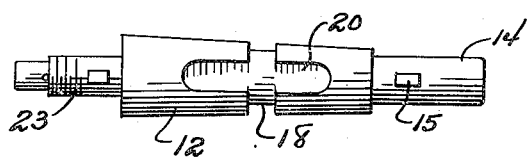
Figure 5 is a plan view from above of the valve plug.

In Figure 4 the manner in which the valve is used for lubricating an automobile is indicated. In this figure, the valve which is indicated at V has distributing pipes or tubes 39 extending therefrom. These pipes or tubes may extend to the various parts of the automobile to be lubricated. The lever 26 has connected thereto the operating wire or cable 38, which as shown passes around a guide pulley 39. The upper end of the wire or cable 38 is connected with an operating button 40 mounted upon the instrument board of the automobile. This button is located within convenient reach of the occupant of the automobile so that the latter may be lubricated by a proper number of pulls upon the button or until the bell 35 is operated to indicate a complete cycle of operation.

The invention is susceptible of various changes in its form, proportions and minor details of construction and the right is herein reserved to make such changes as properly fall within the scope of the appended claim.

Having described the invention what is claimed is:—

A multiple control valve, comprising a housing having a valve chamber provided with a plurality of spaced outlet ports arranged in two circumferential series about the chamber and an inlet port located between the two series of outlet ports, a plug mounted for rotation in said chamber and having an annular groove in communication with the inlet port and grooves extending longitudinally of the plug and in communication with the annular groove and adapted to be brought into communication with respective series of the outlet ports to provide communication between said inlet and outlet ports, a spring influenced ratchet mechanism to rotate the plug and provide communication between the inlet and outlet ports, said ratchet mechanism having a tooth for each outlet port, means to limit rotary movement of the plug at each operation of the ratchet mechanism to position each longitudinal groove in register with the respective outlet port, and yieldable means to hold the plug in such position.

In testimony whereof I affix my signature.

EDD DUGAN.